Nov. 20, 1962 O. KORNEI 3,065,311

MAGNETIC TRANSDUCER

Filed Sept. 15, 1958 2 Sheets-Sheet 1

*INVENTOR:*
OTTO KORNEI

BY Robert E. Sandt

AGENT

Nov. 20, 1962 O. KORNEI 3,065,311

MAGNETIC TRANSDUCER

Filed Sept. 15, 1958 2 Sheets-Sheet 2

INVENTOR.
OTTO KORNEI
BY Robert E. Sandt

AGENT

United States Patent Office 3,065,311
Patented Nov. 20, 1962

3,065,311
MAGNETIC TRANSDUCER

Otto Kornei, Ossining, N.Y., assignor to International Business Machines Corporation, New York, N.Y., a corporation of New York Filed Sept. 15, 1958, Ser. No. 761,235
1 Claim. (Cl. 179—100.2)

This invention relates generally to magnetic recording and reproducing and particularly to an improved multi-channel magnetic transducer.

In the application of magnetic recording and reproducing to accounting machinery it is a desideratum to compress the maximum data into the minimum space consistent with accuracy and reliability. One such typical application is the use of machines for the recognition of alphabetic or numerical characters printed with an ink having a pigment possessed of magnetic properties. In order that the distinguishing configuration of each character be delineated by a sensing apparatus it is necessary that such apparatus have a high degree of resolution. Wherein magnetic transducers are employed for this purpose it is necessary not only that they be arranged in close adjacency but also that each individual transducer be unaffected by the reaction of any adjacent transducer to any character fragment in its respective track or channel.

It is accordingly an object of this invention to provide an improved multi-channel magnetic record transducer having a minimum inter-channel spacing and a maximum freedom from interference between adjacent channels.

Another object of this invention is to provide a multi-channel magnetic record transducer that is readily fabricated.

A further object of this invention is to provide an improved multi-channel magnetic record transducer wherein the configuration of the component parts thereof establishes an accurate alignment of the parts.

A still further object of this invention is to provide a transducer of the above type wherein the foregoing objects are achieved through the use of a minimum of dissimilar parts.

A final and specific object of this invention is to provide a multi-channel magnetic record transducer comprising a plurality of laminations assembled in unit construction wherein the magnetic flux paths of adjacent individual transducers are substantially perpendicular to one another so as to magnetically decouple the adjacent transducers.

Other objects of the invention will be pointed out in the following description and claim and illustrated in the accompanying drawings, which disclose, by way of example, the principle of the invention and the best mode, which has been contemplated, of applying that principle.

Figure 1:
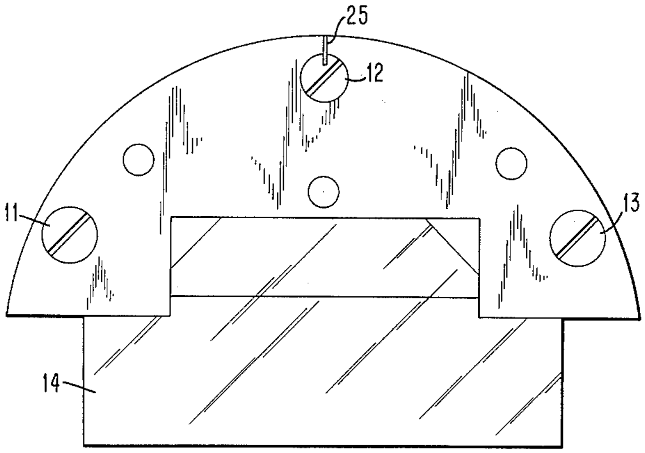
FIG. 1 is an elevation view of the assembled multi-channel transducer.
Figure 2:
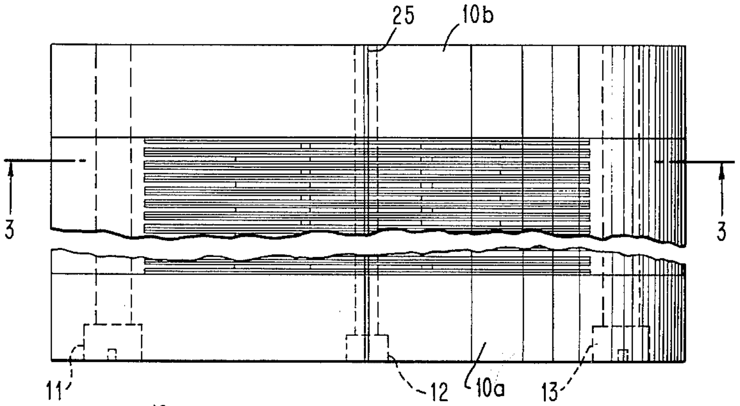
FIG. 2 is a top plan view of the transducer.

In FIGS. 1 and 2 the completed multi-channel transducer is shown after encapsulation and machining thereof. In particular the side plates **10*a* and 10*b*, preferably made of brass or some other suitable non-magnetic material, bind the laminar assembly together by means of fastening screws 11, 12, and 13 which, by their initial tension coupled with the careful selection of the gauge of the stock from which the laminations are stamped, control the inter-channel spacing of the individual transducers. The encapsulation in addition to filling the voids in the laminar assembly as will hereinafter be set forth also provides support for the transducer coil leads which are connected to a detachable connector so as to permit electrical connection of the individual transducer coils with external circuitry. Neither the connector nor the internal connection to the transducer coils have been shown in the drawings, as this unnecessary detail forms no part of the invention. In FIG. 1 the individual air gaps are formed in gross by a narrow slit 25, which is cut subsequent to machining and encapsulation transversely through the entire head assembly to a depth sufficient to completely sever the magnetic core material of each individual transducer which cut extends into the side plates 10*a* and 10*b*, the head of the fastening screw 12**, and all of the laminations intervening between the side plates. Speaking generally, a single unit transducer comprises the transducer core with its attendant coil abutted by a non-magnetic shield lamination and a magnetic shield lamination in that order, all of parts being coated with an insulating paint so as to electrically insulate the respective laminations to prevent eddy current circulation. An adjoining transducer having the same component parts has its transducer core oriented 90° with respect to the adjacent transducer so as to minimize magnetic coupling therebetween. In addition each stack of shielding laminations between any two transducer cores shields one core from another. Because of the decoupling effect of the 90° orientation of the cores and the shielding effects of the intervening laminations, it is possible with this construction to achieve a very close interchannel spacing of the transducers in the order of magnitude of 100 to the inch without aggravating the condition of cross-talk between adjacent channels beyond acceptable limits.

Figures 4, 5, 6:
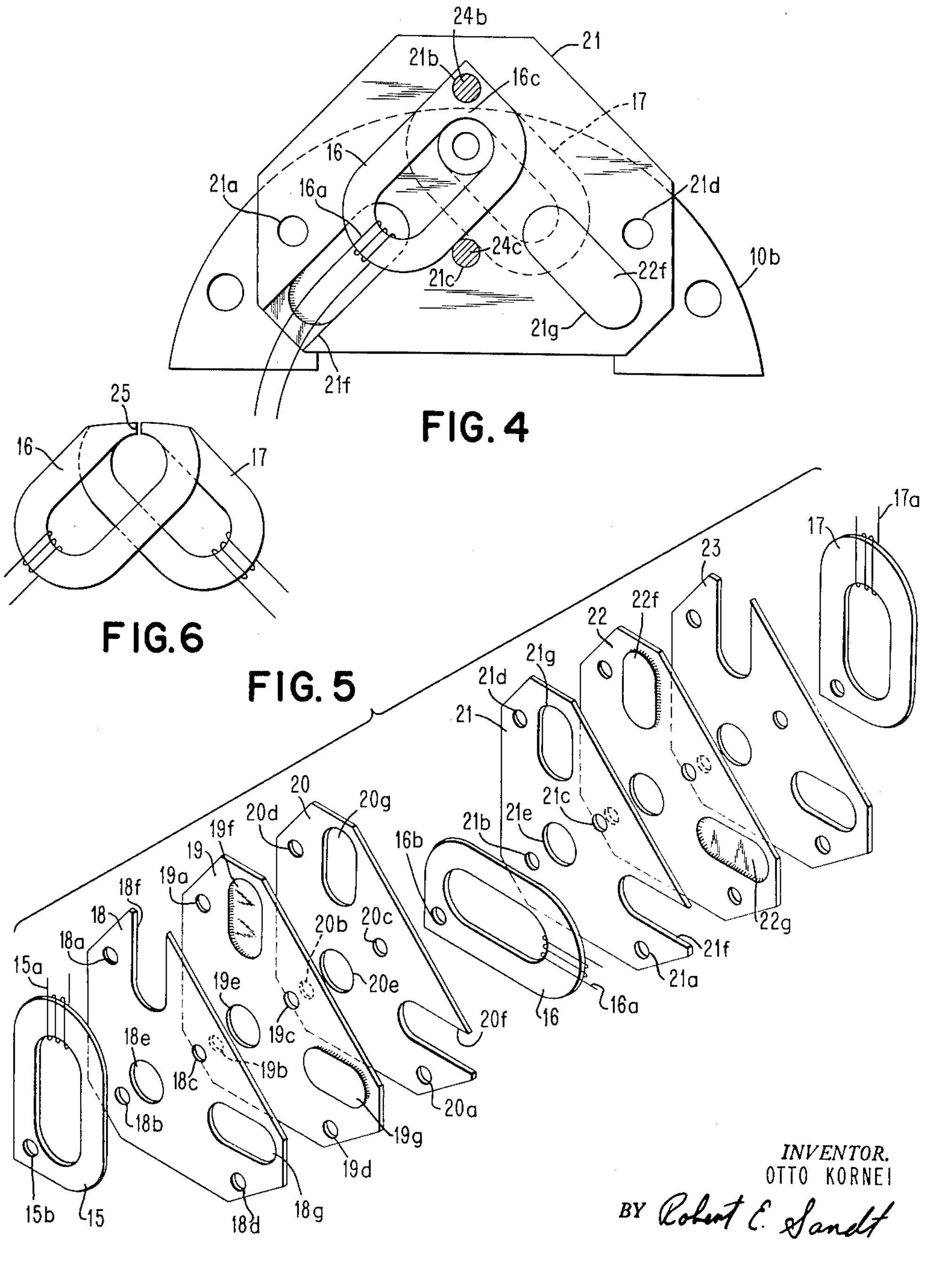
FIG. 4 is a sectional view similar to FIG. 2 but prior to encapsulation and machining.
FIG. 5 is an exploded isometric view of the laminations.
FIG. 6 is a view of two adjacent cores without any intervening laminations.

With respect to FIG. 5 wherein there is shown an exploded isometric view of the laminar construction of the head and the proper orientation of the parts with the exception of the spacing thereof, it should be first noted that the component parts are substantially similar and symmetrical, which fact makes for economy of fabrication inasmuch as the minimum of forming dies is required. Specifically the transducer cores 15, 16, and 17 formed of any suitable magnetic material having a high permeability are exact duplicate parts being stamped by the same forming die and are preferably formed of a plurality of individual laminations. Individual cores 15 and 17 are similarly oriented occupying a substantially vertical disposition as viewed in FIG. 5 whereas the intervening core 16 is disposed horizontally or at 90° with respect to the cores 15 and 17. Additional cores comprising the head will continue the alternating staggered relationship so as to preserve the 90° relativity between the cores of any adjacent channels. In actual practice it has been found that as a result of the 90° orientation the cross-talk between the transducer cores 15 and 16 has been found by test to be less than the cross-talk between the cores 15 and 17, for instance, although the degree of cross-talk in both instances is well below the acceptable maximum limit. Each of the cores 15, 16, and 17 and all other cores have wound thereabout a continuous close-packed winding of wire having a suitable baked-on insulation. Illustrative of these windings in FIG. 5 are the windings **15*a*, 16*a*, and 17*a*. The leads from these windings are led to the suitable connector terminals for connection to external circuitry. Intervening between the cores 15 and 16 are the three shielding laminations 18, 19, and 20. The first of these, shield 18 constructed of brass or other suitable non-magnetic material, has the general configuration of a right isosceles triangle with the corners cut off. Further appearing in this lamination are the holes 18***a*, 18*b*, 18*c*, and 18*d* which holes coact with aligning dowels for locating the parts while they are being stamped or during the assembly operation. A larger hole 18*e* provides isolation of the lamination from the fastening screw 12. A re-entrant notch 18*f* in the lamination, substantially U shaped and open to the exterior edge of the lamination, is of a sufficient size to permit the coil 15*a* of the abutting transducer core 15 to extend thereinto without interference and further permits the leads from the coil 15*a* to be led exterior to the stack for connection as above described. A final aperture 18*g*, oval in shape, is provided as clearance for an upstanding dished portion of the next abutting lamination 19. This next lamination 19, just referred to, has a gross exterior configuration similar to that of the lamination 18 but is constructed of a magnetic material having a high permeability. This lamination contains aligning holes 19*a*, 19*b*, 19*c*, 19*d*, and 19*e* which holes have the same relative disposition as to the corresponding holes in the lamination 18. As a further clearance for the coil 15*a* which protrudes into the notch 18*f* there is provided in the lamination 19 a pocket 19*f* which pocket is dished or raised from the plane of the base material to the right as viewed in FIG. 5. A similar pocket or dished structure 19*g*, similar in configuration but raised to the left from the base material, provides clearance for the coil 16*a* and this raised portion 19*g* extends into, without interference, the aperture 18*g* in the prior lamination. The final lamination 20, constructed of brass, is identical with the lamination 18 but is disposed in the stack with the faces thereof oppositely disposed. The symmetrical disposition of the aligning holes in this lamination permits them to align with corresponding holes in the preceding laminations. To illustrate the rotation of this lamination with respect to the prior laminations, the reference characters applied thereto will be shown with reference to the similar lamination 18. Thus the hole 20*a* corresponding with the hole 18*a* will, by the disposition of the lamination 20, now align with the hole 18*d*. Similarly the aperture 20*g* provides clearance for the raised dish 19*f* as does the aperture 18*g* for the dish 19*g*.

The next stack of transducer elements, including the core 16 and the shield elements 21, 22, and 23, completes a cycle of the assembly up to the core 17, which is oriented vertically as viewed in FIG. 5 along with the core 15. The shield lamination 21 has the same relative disposition as the shield 20, and the shield 23 has the disposition of the shield 18, all of the shields 18, 20, 21, and 23 being identical parts constructed of a non-magnetic material. The shield lamination 22, because of the raised dishes 22*f* and 22*g*, is a mirror-imaged duplicate of the lamination 19. This is true because the dish 22*f* is raised to the left as viewed in the drawing whereas the dish 19*f* is raised to the right. Similarly the dish 22*g* is raised to the right whereas the dish 19*g* is raised to the left. Because of these differences in the arrangement of the dishes, the laminations 19 and 22 are not interchangeable even though the exterior configuration and the aligning holes are all identical.

Figure 3:
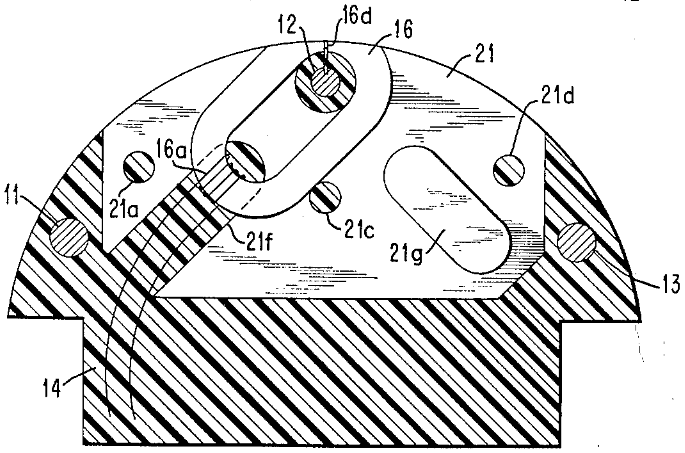
FIG. 3 is a sectional view taken along the line 3—3 of FIG. 2.

With reference to FIG. 4 there is shown a partial stacking of the laminations comprising the transducer assembly prior to machining and encapsulation. The uppermost member is the core 16, having its coil 16*a* shown schematically. Beneath this core successively lie the laminations 21, 22, 23, and the core 17, three additional shield laminations such as 18, 19, and 20, and finally the side plate 10*b*. Additional cores and laminations would, in an actual assembly, be stacked in depth to achieve the required number of channels. It will be noted that an aligning dowel 24*b* projects through all of the *b* identified holes in the laminations. The dowel 24*c* effects a further alignment by extending through the *b* identified holes in the shields and by being tangent to the transducer cores. Because this dowel remains in place after assembly it is made of an insulating material. The leads from the coil 16*a* lie in the notch 21*f*, which notch provides clearance to permit the wires to be led outside of the stack for attachment to the appropriate connector terminals. With the alignment achieved by the foregoing dowels the stack is completed and the final plate 10*a* added. The whole assembly is then bound into a unit structure by the addition of the screws 11, 12, and 13, the screws 11 and 13 being insulated from the side plate 10*a* so as to stop any induced current flow in an otherwise conducting loop consisting of the side plates 10*a* and 10*b*, the screw 12 and either screw 11 or 13. The thus assembled unit is encapsulated in any of the well known plastic compounds having the desirable properties of dimensional stability and good electrical insulation and then machined to a rough cylindrical surface in general conformity to the cylindrical surfaces of the side plates 10*a* and 10*b*. During this operation the aligning dowel 24*b* is machined away and serves no further purpose during this operation. This machining operation cuts away the cores leaving a narrow reduced cross-sectional area in the region 16*c* which area will be severed in a subsequent slitting operation to form the transducer air gap. This slitting operation is best shown in FIG. 3 where the individual cut 16*d* in the core 16 is shown. This cutting is effected by a single slot 25 across the whole face of the assembled unit and which of necessity also extends into the screw head 12. During the encapsulation as is shown in FIG. 3 the plastic compound 14 fills all of the voids between the laminations as, for instance, the notch 21*f* becomes filled with plastic as do all of the other similar notches in the other laminations. The screw 12 is surrounded in plastic to insulate it from the individual cores. Upon completion of the rough shaping operation, the entire assembly is given a finish machining operation, including precision grinding of the cylindrical surface, so as to achieve a minimum of abrasive action upon any record material traversed thereover.

As a variation of the above-described method of fabrication, transducers of extremely fine longitudinal resolution have been constructed by assembling the laminations as above described, encapsulating, rough machining, cutting the assembly into two halves, lapping the mating surfaces, and reassembling the halves with an intervening non-magnetic foil to form aligned gaps. For such application minor changes are made in the configuration and arrangement of the component parts so that the cutting will not sever any critical parts, as for instance, the securing screw 12. Allowance is also made in the shape of the core structures for increasing the cross-sectional area of the core in the back-gap area and for correcting any mismating of the cores due to material that is of necessity lost by the cutting operation.

The orientation of the magnetic circuits in adjacent transducer cores is best shown in FIG. 6 wherein the two cores 16 and 17 are shown in their relative overlapped assembled position without any intervening shielding laminations. If one assumes that in a closed magnetic circuit the flux path is substantially aligned with the configuration of the magnetic material itself, it will be readily apparent that the respective flux paths in the cores 16 and 17 will be perpendicular to one another throughout the greater percentage of their paths because of the 90° orientation of the cores and, because of their particular configuration, the areas of non-perpendicularity have a maximum physical separation so that effective decoupling is had between adjacent cores. Because of the circular end configuration of the cores, it is only in the immediate area of the gap 25 that the flux paths in the two cores are aligned and in close proximity. Immediately adjacent to the gap area the relative orientation of the flux paths changes rapidly from parallelism at the gap to perpendicularity at the point of tangency to the straight sections. This overlapping transition area is so small as compared with the remaining core area that the magnetic coupling between adjacent cores is thus minimized.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claim.

What is claimed is:

A multi-channel magnetic transducer comprising (*a*) a plurality of flat identically formed magnetic core structures, each of which comprises a pair of spaced parallel straight sections joined by a semi-circular end section, and a pair of converging curved sections depending from said straight sections and terminating in a pair of spaced pole pieces defining a non-magnetic working gap, the said straight sections being so proportioned that the overall length of the core parallel to said straight sections is substantially greater than the overall width of the core;

(*b*) a signal winding wound on the curved end section of each core;

(*c*) and a plurality of shield laminations disposed in abutting relationship between the cores so as to fix the cores in spaced parallel planes;

(*a*1) the said cores being disposed in their respective planes with alternate ones thereof overlying one another in aligned relationship, and adjacent ones of said cores partially overlying one another in misaligned relationship, with the pair of straight sections of any given core being perpendicularly oriented with respect to the pair of straight sections of the next adjacent core, and the working gaps of all the cores being aligned along a line perpendicular to the planes of the flat cores;

whereby the flux paths of adjacent cores are substantially decoupled so as to minimize crosstalk between adjacent cores.

References Cited in the file of this patent

UNITED STATES PATENTS

| | | |
|---|---|---|
| 2,732,275 | MacNeill | Jan. 24, 1956 |
| 2,751,440 | De Turk et al. | June 19, 1956 |
| 2,769,036 | Selsted | Oct. 30, 1956 |
| 2,872,530 | Jolly | Feb. 3, 1959 |
| 3,000,078 | Enenaker | Sept. 19, 1961 |

FOREIGN PATENTS

| | | |
|---|---|---|
| 884,881 | France | May 10, 1943 |